(12) United States Patent
Couleaud et al.

(10) Patent No.: US 10,701,132 B2
(45) Date of Patent: Jun. 30, 2020

(54) TRANSFERRING CONTENT BETWEEN A GROUND BASED CONTENT SERVER AND AN AIRCRAFT BASED CONTENT SERVER VIA CONTENT FRAGMENTS DISTRIBUTED ACROSS COURIER ELECTRONIC DEVICES

(71) Applicant: Thales Avionics, Inc., Irvine, CA (US)

(72) Inventors: Jean-Yves Couleaud, Mission Viejo, CA (US); Tracy Decuir, Yorba Linda, CA (US)

(73) Assignee: Thales Avionics, Inc., Irvine, CA (US)

( * ) Notice: Subject to any disclaimer, the term of this patent is extended or adjusted under 35 U.S.C. 154(b) by 260 days.

(21) Appl. No.: 15/210,648

(22) Filed: Jul. 14, 2016

(65) Prior Publication Data

US 2018/0020042 A1  Jan. 18, 2018

(51) Int. Cl.
*H04L 29/08* (2006.01)

(52) U.S. Cl.
CPC .............. *H04L 67/06* (2013.01); *H04L 67/10* (2013.01); *H04L 67/1097* (2013.01); *H04L 67/32* (2013.01)

(58) Field of Classification Search
CPC .......... H04L 67/06; H04L 47/14; H04L 47/15
USPC ........................................................ 709/217
See application file for complete search history.

(56) References Cited

U.S. PATENT DOCUMENTS

| | | | | |
|---|---|---|---|---|
| 9,226,000 B1* | 12/2015 | Knight | ............... | H04N 21/2146 |
| 9,967,595 B1* | 5/2018 | Provost | .............. | H04N 21/2146 |
| 2005/0129239 A1* | 6/2005 | Farley | ................ | H04B 7/18502 380/270 |
| 2006/0031748 A1* | 2/2006 | Brady, Jr. | .............. | H04H 20/62 715/201 |
| 2006/0195909 A1* | 8/2006 | Boswell | ........... | G11B 20/00086 726/26 |
| 2007/0288715 A1* | 12/2007 | Boswell | ........... | G11B 20/00086 711/164 |
| 2010/0138879 A1* | 6/2010 | Bird | ........................ | H04H 20/62 725/76 |
| 2010/0169780 A1* | 7/2010 | Bryant-Rich | ........ | G11B 27/005 715/719 |
| 2011/0257834 A1* | 10/2011 | Hebb | ..................... | G06Q 10/08 701/31.4 |
| 2015/0150061 A1* | 5/2015 | Bleacher | .............. | H04N 21/422 725/76 |

(Continued)

*Primary Examiner* — Nicholas R Taylor
*Assistant Examiner* — Chong G Kim

(57) ABSTRACT

A ground based content server transfers content to an aircraft based content server via courier devices that are transported by aircraft passengers. Content files to be delivered to a target aircraft are identified. Courier devices associated with persons scheduled to become passengers on the target aircraft are identified. Each of the content files are divided into content fragments, where the content fragments collectively contain all data necessary for reassembling the content files. The content fragments are distributed from the ground based content server across the courier devices, so that each courier device is distributed one of the content fragments containing data that is at least partially redundant with data contained in one of the content fragments that is distributed to at least one other one of the courier devices and that is not redundant to data contained in other content fragments distributed to still other ones of the courier devices.

7 Claims, 5 Drawing Sheets

(56) References Cited

U.S. PATENT DOCUMENTS

| | | | |
|---|---|---|---|
| 2016/0127334 A1* | 5/2016 | Bangole | H04L 63/0428 |
| | | | 713/171 |
| 2016/0344792 A1* | 11/2016 | Sinivaara | H04N 21/2146 |
| 2017/0026676 A1* | 1/2017 | Watson | H04H 20/62 |
| 2017/0353506 A1* | 12/2017 | Warrick | H04L 67/18 |
| 2018/0027036 A1* | 1/2018 | Watson | H04B 7/18506 |
| | | | 709/219 |
| 2018/0027037 A1* | 1/2018 | Watson | H04L 65/60 |

\* cited by examiner

TRANSFERRING CONTENT BETWEEN A GROUND BASED CONTENT SERVER AND AN AIRCRAFT BASED CONTENT SERVER VIA CONTENT FRAGMENTS DISTRIBUTED ACROSS COURIER ELECTRONIC DEVICES

FIELD OF THE INVENTION

The present disclosure relates to systems for transferring content between a ground based computer server and an aircraft based or other vehicle based computer content server.

BACKGROUND

In-flight entertainment (IFE) systems have been deployed onboard aircraft to provide entertainment for passengers in a passenger cabin. The in-flight entertainment systems typically provide passengers with, movies, television, and audio entertainment programming.

Updating content files in IFE systems can require a large amount of data to be transferred between ground based content servers and aircraft based content servers. In an upload direction, movie and television programs, weather reports, news reports, electronic publications and other content can be amongst the types of content that must be transferred from a ground based content server to an aircraft's on-board content server. In the download direction, it is desirable to transfer content generated during the flight, including IFE usage statistics, food inventory reports, product inventory reports, and electronic systems health monitoring reports from the aircraft based content server to the ground based content server upon each arrival of the aircraft to an airport terminal.

For an aircraft equipped with a wireless data communication subsystem, some content files can be uploaded or downloaded through wireless data links during flight or upon arrival at an airport. Wireless ground data links can be installed at airports but the cost of deployment and maintenance can be prohibitively expensive. For these and other reasons many airports around the world do not have wireless ground data link systems or have systems that provide insufficient communication bandwidth to enable completion of large content file transfers while an aircraft remains at the airports between flights. Moreover, the per-megabyte usage cost of subscriber-based ground and satellite data links, e.g., licensed cellular/satellite based systems, can be prohibitively expensive to use for many types of large content file transfers.

SUMMARY

Some embodiments of the present disclosure are directed to a method performed by at least one processor of a ground based content server to transfer content to a vehicle based content server. Content files to be delivered to a vehicle based content server on a target vehicle are identified. Courier electronic devices that are associated with persons who are scheduled to become passengers on the target vehicle are identified. Each of the content files are divided into content fragments, where the content fragments collectively contain all data necessary for reassembling the content files. The content fragments are distributed from memory of the ground based content server across memory of the courier electronic devices that have been identified. The distributing is performed so that each of the courier electronic devices is distributed one of the content fragments containing data that is at least partially redundant with data contained in one of the content fragments that is distributed to at least one other one of the courier electronic devices and that is not redundant to data contained in other ones of the content fragments that are distributed to still other ones of the courier electronic devices.

Some other embodiments of the present disclosure are directed to a method performed by at least one processor of a vehicle based content server to receive content files provided by a ground based content server. The method discovers presence of content fragments stored in memory of courier electronic devices that have been transported onto the vehicle by passengers and which have established communication links with the vehicle based content server. The content fragments are fetched from the courier electronic devices, responsive to the discovering. The content files are assembled by combining at least some of the content fragments. Content of the content files is provided to video display units operated by passengers.

Some other embodiments of the present disclosure are directed to a method performed by at least one processor of a courier electronic device to transfer content between a ground based content server and a vehicle based content server. A scheduling message is communicated to the ground based content server indicating an upcoming flight schedule for a person who possesses the courier electronic device. A content fragment is received from the ground based content server responsive to the scheduling message, the content fragment containing an incomplete fragment of a content file. A communication link is established with the vehicle based content server, and the content fragment is transferred to the vehicle based content server. A listing of content files, which are available for on-demand consumption through the courier electronic device and which includes the content file assembled based on the content fragment, is received from the vehicle based content server. The listing of content files is displayed on a display device of the courier electronic device.

Other methods, computer program products, and/or systems according to embodiments of the inventive subject matter will be or become apparent to one with skill in the art upon review of the following drawings and detailed description. It is intended that all such additional methods, computer program products, and/or systems be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to innovative ways for transferring content files from a ground based content server to vehicle based content servers using courier electronic devices, such as passengers' mobile phones. Although embodiments herein are primarily described in the context of transferring content files to and/or from an aircraft based content server that is part of an In-flight entertainment (IFE) system deployed onboard on an aircraft, the invention is not limited thereto. Instead, these and other related embodiments may be used to transfer content files to and/or from content servers located in other types of vehicles, including without limitation, trains, automobiles, cruise ships, and buses.

Figure 1:
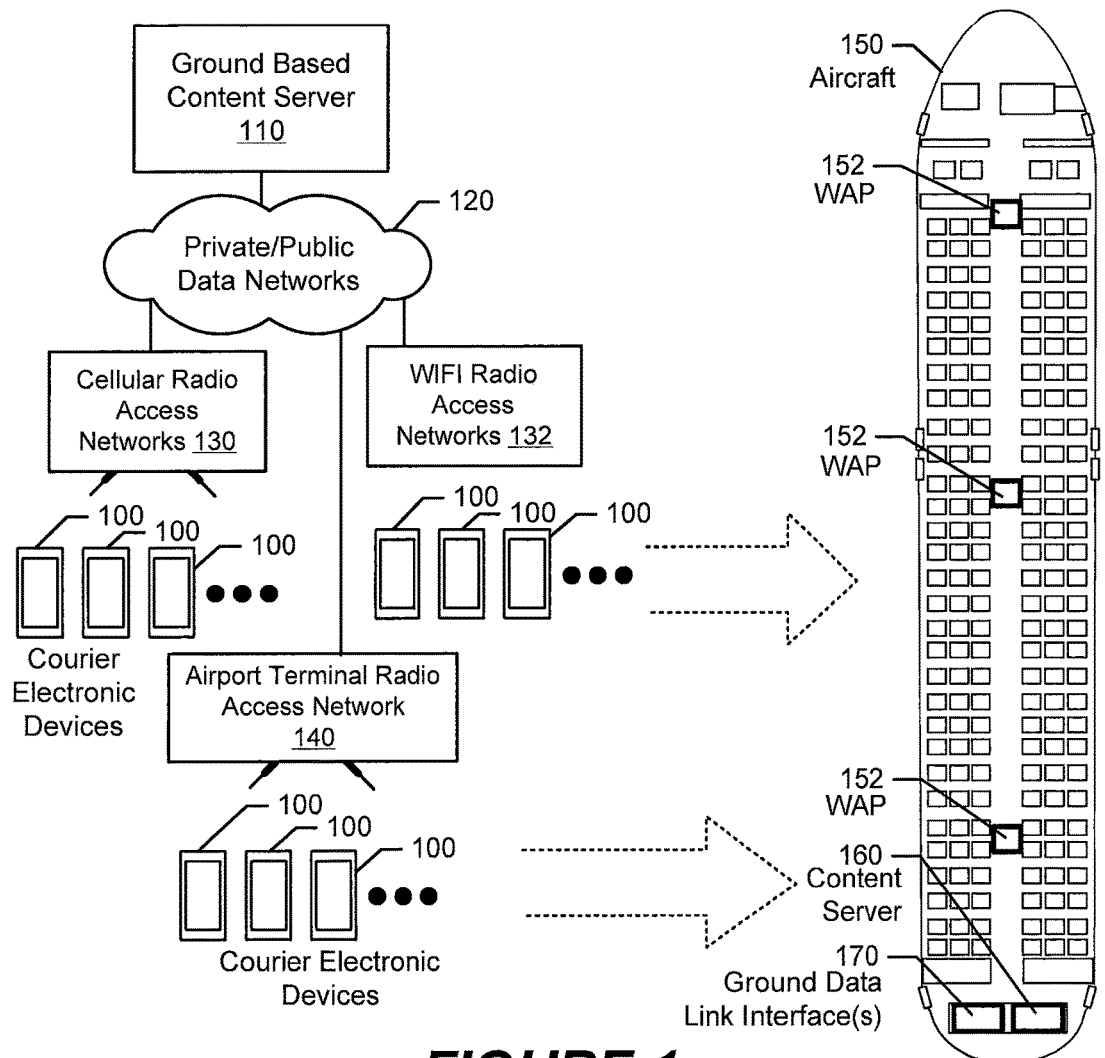
FIG. 1 is a block diagram of a content distribution system that transfers content files between a ground based server and aircraft based content servers via content fragments that are distributed across courier electronic devices for transportation onboard and off-board the aircraft, in accordance with some embodiments of the present disclosure.

FIG. 1 is a block diagram of a content distribution system that transfers content files between a ground based server 110 and an aircraft 150 based content server 160 via content fragments that are distributed across courier electronic devices 100 for transportation onboard and off-board the aircraft 150, in accordance with some embodiments of the present disclosure.

Referring to FIG. 1, an IFE system provides entertainment services for passengers in a passenger cabin of the aircraft 150. The IFE system includes a content server 160 that stores content files which may include movies, television programming, games, applications, electronic books/magazines, etc. The aircraft based content server 160 can stream and/or download content of the content files to video display units (VDUs) that are installed within seatbacks and attached to seat armrests/frames, bulkheads, overhead structures, or elsewhere within the cabin. The content server 160 may additionally or alternatively stream and/or download content of the content files to VDUs of courier electronic devices 100 that are transported by passengers and/or crew members onboard and off the aircraft 150. Other content files that can be uploaded to the content server 160 can include airline operations data, flight related data including a passenger manifest, etc.

Passengers may also be provided in-flight shopping services through the seat VDUs and the courier electronic devices 100 based on product catalogs that are downloaded from the aircraft based content server 160. The content server 160 may include a product sales application that operates to allow passengers to purchase products through the seat VDUs and/or the courier electronic devices 100, and which stores product inventory listings and purchase transaction information for subsequent transfer to the ground based content server 110 and/or another content server.

The content server 160 may be communicatively connected to the seat VDUs and/or the courier electronic devices 100 through a wired data network (e.g., Ethernet cabling and electronic network interfaces) and/or a wireless data network. An example wireless data network is illustrated in FIG. 1 that includes a plurality of wireless access points (WAPs) 152 that are installed (mounted) at spaced apart locations within the aircraft 150 fuselage to provide corresponding wireless communication service cells. The WAPs 152 communicate through a wireless air interface that can be based on one or more communication protocols including, without limitation, any one or more of IEEE 802.11, WIMAX, 3GPP Long Term Evolution (LTE), etc.

The courier electronic devices 100 can include, without limitation, tablet computers, laptop computers, palmtop computers, cellular smart phones, media players, etc. When owned by a passenger, a courier electronic device 100 can also be referred to as a passenger electronic device (PED).

The aircraft 150 may also include a ground data link interface 170 that is configured to provide wireless data communications through a satellite communication system and/or through direct aircraft-to-ground communication links. The ground data link interface 170 may be any ground connectivity system that provides data communications capabilities for aircraft within range of ground based communications network equipment located at airports, using radio transceiver circuits located onboard the aircraft and at airports (e.g., at gate locations). The wireless communications may be performed using IEEE 802.11, WIMAX, and/or 3GPP LTE technologies. The aircraft can be recognized by the ground network when it arrives at an airport or gate, and a communication link can be established between the aircraft based content server 160 and a ground based content server 110 via the ground network.

Updating content files for aircraft based content servers 160 can require a large amount of data to be transferred from the ground based content server 110 to the aircraft based content servers 160 and, potentially, vice versa. In an upload direction to the aircraft 150, movie and television programs, weather reports, news reports, electronic publications, passenger manifests, airline operations data, and other content can be amongst the types of content files that must be transferred from the ground based content server 110 to the aircraft based content server 160. In the download direction from the aircraft 150, it can be desirable to transfer content generated during the flight, including IFE usage statistics, onboard food inventory reports, onboard product inventory reports, and onboard electronic systems health monitoring reports, from the aircraft based content server 160 to the ground based content server 110 upon each arrival of the aircraft 150 to an airport terminal.

Unfortunately, the short range of IEEE 802.11 network protocols requires that system implementation involve modification of the airport facility from the facility backhaul network to the aircraft gates. Cellular networks can also be used to transfer information to and from an aircraft while it is on the ground, but the relatively low bandwidth supported by such networks and associated cost per megabyte for transferring data can make transfer of IFE related content files and other large files insufficiently fast to enable completion of transfer of content files while the aircraft 150 remains at an airport between flights and, even if completed, may result in prohibitive costs to do so.

Broadband satellite communications can be used to exchange data between an in-flight aircraft and the ground based content server 110. However, performance of satellite communications systems varies between the lower speed satellite communications (SATCOM) based systems (X.25, Swift64 or BGAN) to the higher speed KU band systems (ConneXion, Row44). In general, these satellite links are limited to between 64 Kbps and 20 Mbps. This bandwidth must be shared by all users in a large geographical area. In addition, the current regulations on aircraft based KU Band and/or KA Band service do not permit aircraft to ground transmission to occur while the aircraft is on the ground. A single channel would be shared by many different aircraft at many different airports. Moreover, using satellite communications to transfer IFE related content files and other large files can be prohibitively expensive.

For these and other reasons, various embodiments disclosed herein are directed to using the courier electronic devices 100 to transfer content files between the ground based content server 110 and the aircraft based content server 160. More particularly, the content distribution system transfers content files between the ground based server 110 and the aircraft based content server 160 via content fragments that are distributed across the courier electronic devices 100 for transportation onboard and off-board the aircraft 150 by passengers.

Figure 3:
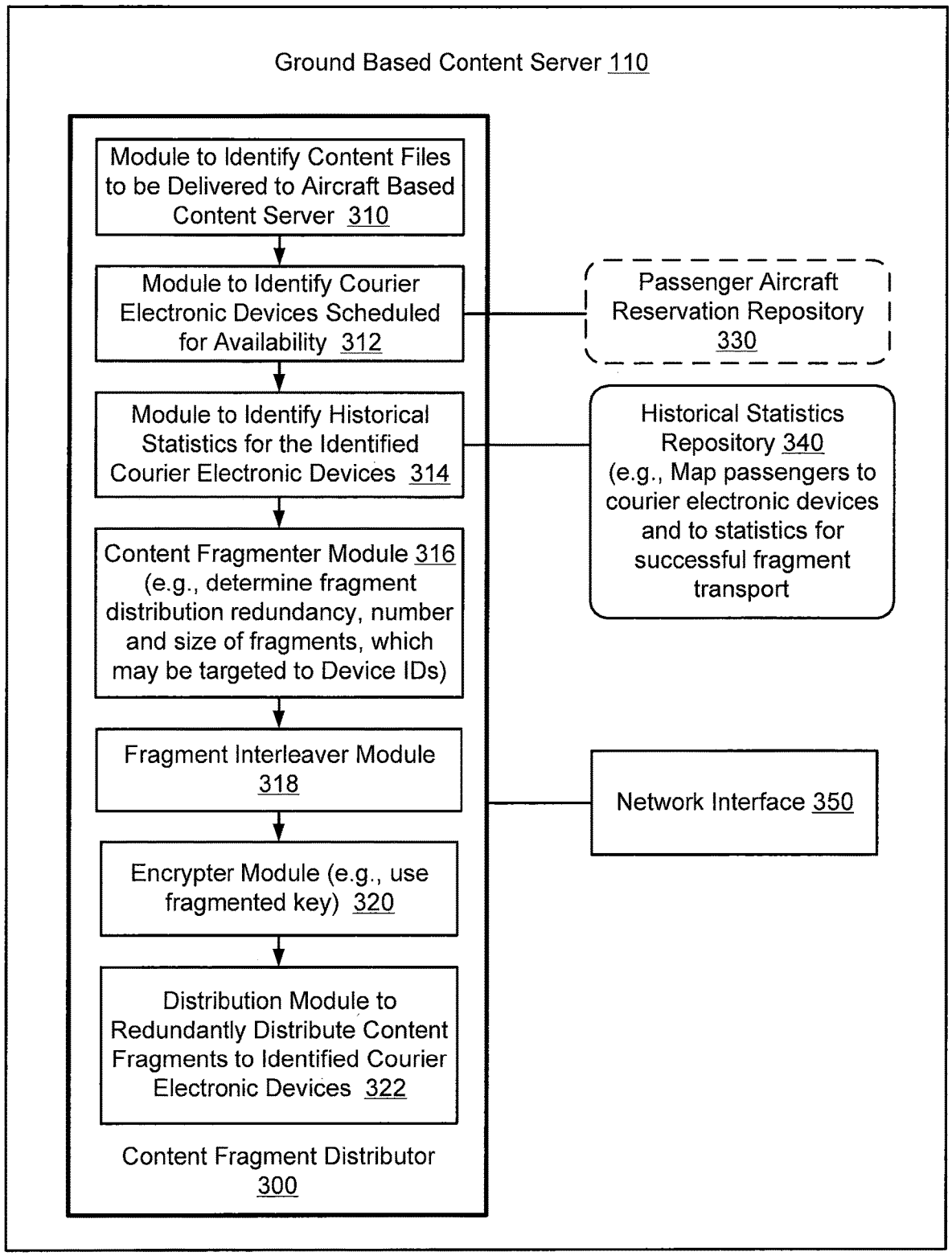
FIG. 3 is a block diagram of operational components of the ground based content server of FIG. 1 that generate and distribute content fragments to courier electronic devices for transport onboard a target aircraft, in accordance with some embodiments of the present disclosure.

FIG. 3 is a block diagram of operational components of the ground based content server 110 of FIG. 1 that generate and distribute content fragments to the courier electronic devices 100 for transport onboard a target aircraft, in accordance with some embodiments of the present disclosure. Content server 110 includes a content fragment distributor 300, a network interface 350, and may include a historical statistics repository 340 and a passenger aircraft reservation repository 330 that will be explained in further detail below.

Referring to FIGS. 1 and 3, to transfer content files to the aircraft 150, the ground based content server identifies (module 310) content files that are to be delivered to the vehicle based content server 160 on a target vehicle. Courier electronic devices 100 are identified (module 312) which are associated with persons who are scheduled to become passengers on the target vehicle 150 where the content files are desired to be transferred. Each of the content files are fragmented (module 316) into content fragments, where the content fragments collectively contain all data necessary for reassembling the content files. In contrast, at least one, and perhaps all, of the content fragments is generated to not contain enough data to allow reassembly of any one of the content files, according to at least one embodiment. The content fragments are then distributed (module 322) from memory of the ground based content server 110 across memory of the courier electronic devices 100 that have been identified.

Identification (module 312) of courier electronic devices 100 that are associated with persons who are scheduled to become passengers on the target vehicle 150, can include operating during a flight reservation session between an application executed by one of the courier electronic devices 100 and a passenger aircraft reservation repository 330 contained in or otherwise accessible to the ground based content server 110, to receive a message from the one of the courier electronic devices 100 indicating permission for the ground based content server 110 to transfer a content fragment to memory of the one of the courier electronic devices 100 for relay to the vehicle based content server 160 of the target vehicle 150. Distribution (module 322) of the content fragments from memory of the ground based content server 160 across memory of the courier electronic devices 100 can include operations for, responsive to the message, communicating the content fragment to memory of the one of the courier electronic devices 100 and initiating operations by the one of the courier electronic devices 100 to respond to subsequent establishment of a communication link between the one of the courier electronic devices 100 and the vehicle based content server 160 of the target vehicle 150 by transferring the content fragment to the vehicle based content server 160.

The distributing is performed so that each of the courier electronic devices 100 is distributed one of the content fragments containing data that is at least partially redundant with data contained in one of the content fragments that is distributed to at least one other one of the courier electronic devices 100 and that is not redundant to data contained in other ones of the content fragments that are distributed to still other ones of the courier electronic devices 100.

Generating some of the content fragments so that they contain redundant data can be advantageous because it is foreseeable that at least some of the identified courier electronic devices 100 will not be brought on board the target aircraft 150 by the associated passengers for a flight, will not establish a communication link to the aircraft based content server 160 to enable transfer thereto, or will not remain connected for sufficient time to allow completion of transfer of the content fragments therein to the aircraft based content server 160 (e.g., due to insufficient battery life and/or unexpected passenger interruption of the transfer). Because at least some of the content fragments contain redundant data, the aircraft based content server 160 can assemble the content file using data from a plurality of received content fragments in spite of some of the content fragments not been received completely and/or having no portion thereof received.

Distribution of the content fragments from the ground based content server 110 to the courier electronic devices 100 may be performed through a network interface 350 and communicatively connected to public data networks and/or private data networks 120, e.g., Internet, and wireless and/or wired data networks connected to the courier electronic devices 100. Transfer of the content fragments may be performed during a person's reservation of a scheduled flight on the target aircraft 150 and/or thereafter using cellular radio access networks 130 and/or WiFi radio access networks 132, and/or while at an airport terminal awaiting the scheduled flight using various airport terminal radio access networks 140.

An amount of the redundancy in the data of at least some of the content fragments that are to be distributed across the courier electronic devices 100, can be controlled (module 316) based on a number of the courier electronic devices 100 that have been identified as being associated with persons who are scheduled to become passengers on the target aircraft 110. In one embodiment, the amount of redundancy is increased based on identifying a greater number of the courier electronic devices 100 that are associated with persons who are scheduled to become passengers on the target vehicle 150. Similarly, the amount of redundancy is decreased based on identifying a lesser number of the courier electronic devices 100 that are associated with persons who are scheduled to become passengers on the target vehicle 150.

For example, assume 20 courier electronic devices 100 would be needed to transport a collection of content fragments needed to assemble a content file, due to constraints of available memory in those courier electronic devices 100 and/or due to one or more defined rules that constrain how much memory, communication bandwidth, battery power, and/or other resources of any one or more courier electronic devices 100 that can be used to transfer data between the ground based content server 110 and the aircraft based content server 160. In one approach, the content fragments are transferred to be spread across the first 20 courier electronic devices 100 that are identified as being associated with persons who are scheduled for a same flight on the target aircraft 150. However, there is a risk that one or more of those 20 courier electronic devices 100 will not be transported onto the target aircraft 150 or will not otherwise operate to complete transfer of their respective content fragments to the aircraft based content server 160, e.g., due to insufficient battery life or the passenger turning off the device. This would result in the aircraft based content server 160 being unable to reassemble the content file because of one or more necessary content fragments not being available. The content fragments could be transferred to be spread across more than 20 courier electronic devices to 100 so that there is a greater likelihood that at least 20 of the courier electronic devices 100 will successfully complete their respective content fragments to the aircraft based content server 160. However, there's still a risk that a necessary one of the content fragments will not be successfully uploaded from the one or more courier electronic devices 100 storing the necessary content fragment. Thus, in at least one embodiment, the content fragments are generated with partially redundant data so that, in the above example, receipt of 20 or more content fragments from any of the courier electronic devices 100 can enable the aircraft based content server 160 to successfully reassemble the content file.

In a further embodiment, the amount of redundancy used when generating the content fragments is controlled based on use of historical statistics developed from reports of successful transfers completed in the past for content fragments transported from the ground based content server to vehicle based content servers using the courier electronic devices associated with the persons who are scheduled to become passengers on the target vehicle. In the example of FIG. 3, the ground based content server 110 can contain or otherwise access a historical statistics repository 340 which contains information mapping passengers' names or other identifiers to courier electronic devices' identifiers (e.g., mobile phone serial numbers and/or other IDs), and further maps that information to statistics for prior reported uses of the identified courier electronic devices that successfully and/or unsuccessful completed transport of content fragments from the ground based content server 110 to aircraft based content servers 160. For privacy reasons or other purposes the historical statistics repository 340 may map anonymized passenger identifiers, instead of passenger names, to courier electronic device identifiers. The statistics may particularly identify which aircraft based content servers 160 the transfers were completed for, so that the statistics reflect a particular passenger's likelihood of using a particular courier electronic device in a way that allows successful transfer of a content fragments. For example, the statistics may indicate that a particular passenger has brought onboard and allowed their cellular phone to complete such transfers during each of two flights between two identified cities and during each of three flights between three other identified cities, the ground based content server 110 can use those statistics to more accurate predict the likelihood that the particular passenger will properly serve as a reliable courier of a data fragment for a particular upcoming scheduled flight between a pair of those same identified cities. Alternatively or additionally, the statistics may identify the flight durations and completed transfers, so that the ground based content server 110 can predict the likelihood that the particular passenger will properly serve as a reliable courier of a data fragment for a particular upcoming scheduled flight having a scheduled flight duration having a defined similarity to (e.g., within a threshold range of) one of the flight durations indicated by the statistics.

In one embodiment, the amount of redundancy is increased based on the historical statistics indicating a lower likelihood of at least some of the courier electronic devices 100, which are associated with persons who are scheduled to become passengers on the target vehicle 150, being both present and operated upon boarding of the vehicle 150 by the passengers to allow successful transfer of the content fragments from the at least some of the courier electronic devices 100 to the vehicle 150 to enable reassembly of the content files by the vehicle based content server 160. Similarly, the amount of redundancy is decreased based on the historical statistics indicating a higher likelihood of the at least some of the courier electronic devices 100, which are associated with persons who are scheduled to become passengers on the target vehicle 150, being both present and operated upon boarding of vehicle 150 by the passengers to allow successful transfer of the content fragments from the at least some of the courier electronic devices 100 to the vehicle 150 to enable reassembly of the content files by the vehicle based content server 160.

The amount of the redundancy can be controlled based on a number of the courier electronic devices 100 that have completed receipt of the content fragments from the ground based content server 110 for transport to the target vehicle 150. In one embodiment, once content fragments have been transferred to a threshold number of courier electronic devices 100, e.g., which may be sufficient to enable reassembly of a content file, further content fragments can be generated to contain data that is redundant with the earlier content fragments and which are then distributed to at least some subsequently identified courier electronic devices 100 to increase the likelihood that the aircraft based content server 160 will receive sufficient data from enough courier electronic devices 100 to enable reassembly of the content file upon boarding of the passengers.

Continuing reference to FIG. 3, when dividing (module 316) each of the content files into content fragments, size of the content fragments can be controlled based on a number of the courier electronic devices 100 that are identified as associated with persons who are scheduled to become passengers on the target vehicle 150.

In one embodiment, size of the content fragments is controlled based on use of historical statistics developed from reports of successful transfers completed in the past for content fragments transported from the ground based content server to vehicle based content servers using the courier electronic devices associated with the persons who are scheduled to become passengers on the target vehicle.

Statistics obtained from the historical statistics repository 340 can be used to determine the size of the content fragments are to be generated. When passengers and associated courier electronic devices 100 are identified as having statistics that are favorable to the likelihood that content fragments transferred thereto will be successfully uploaded to the aircraft based content server 160, the content fragments can be generated to be larger since there is a higher likelihood of successful transfer. In contrast, when the statistics indicating less favorable likelihood that content fragments transferred thereto will be successfully uploaded, the content fragments can generate a smaller and dispersed across a greater number of courier electronic devices 100 to compensate for lower historical success rate for those courier electronic devices 100. The size of content fragments can be further controlled in a similar manner to that described herein for controlling redundancy based on information contained in the historical statistics repository 340.

The content fragment distributor 300 may interleave (module 318) data contained in the content fragments to generate interleaved content fragments. The interleaved content fragments are then distributing from the memory of the ground based content server 110 across memory of the courier electronic devices 100. Interleaving data contained in the content fragments can enable reassembly of a content file in spite of some otherwise necessary content fragments not been received by the aircraft based content server 160 from certain courier electronic devices 100.

In one embodiment, when dividing (module 316) each of the content files into content fragments, an amount of redundancy of data contained in some of the content fragments is decreased based on identifying a greater number of the courier electronic devices 100 associated with persons who are scheduled to become passengers on the target vehicle 150. In contrast, the amount of redundancy of data contained in some of the content fragments is increased based on identifying a lesser number of the courier electronic devices 100 associated with persons who are scheduled to become passengers on the target vehicle 150.

The content fragment distributor 300 may encrypt (module 320) the content fragments before distribution to the courier electronic devices 100. Encrypting data contained in the content fragments can prevent a person who possesses the courier electronic device 100 from using the data. The content fragment distributor 300 may alternatively or additionally interleave data contained in a content file across a plurality of content fragments. Interleaving data in this manner can increase the ability of the receiving device to reassemble the original content firm in spite of missing one of the data fragments.

Figure 2:
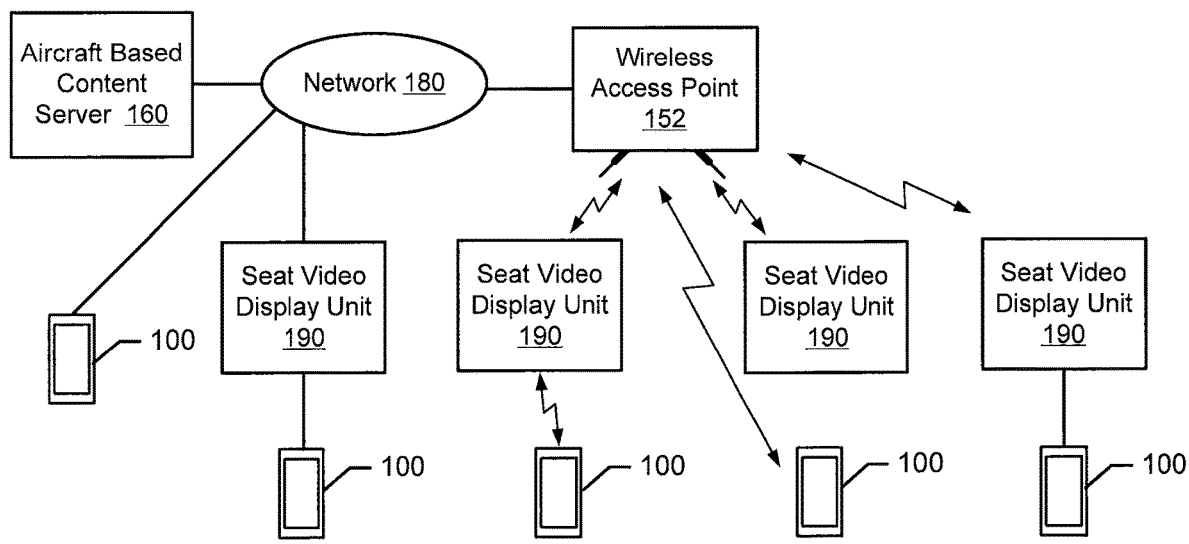
FIG. 2 is a block diagram of an aircraft on-board content distribution system that transfers content fragments between onboard courier electronic devices and an aircraft based content server, in accordance with some embodiments of the present disclosure.
Figure 4:
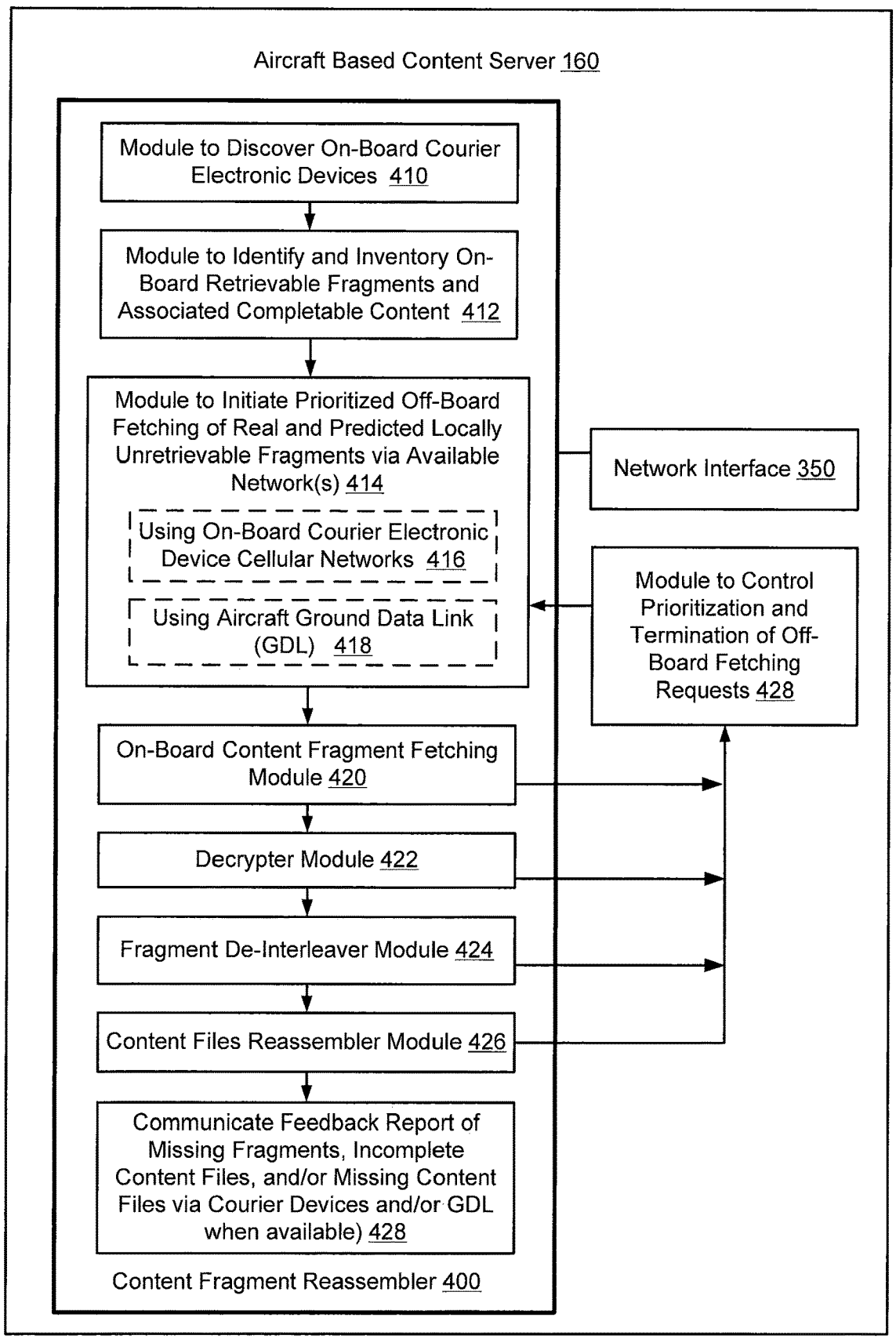
FIG. 4 is a block diagram of operational components of the aircraft based content server of FIG. 1 that receive content fragments from onboard courier electronic devices and reassemble the original content files, in accordance with some embodiments of the present disclosure.

FIG. 2 is a block diagram of an aircraft on-board content distribution system that transfers content fragments between onboard courier electronic devices 100 and the aircraft based content server 160, in accordance with some embodiments of the present disclosure. FIG. 4 is a block diagram of operational components of the aircraft based content server 160 of FIG. 1 that receive content fragments from onboard courier electronic devices 100 and reassemble the original content files, in accordance with some embodiments of the present disclosure.

Referring to FIGS. 2 and 4, the aircraft based content server 160 discovers (module 410) presence of content fragments stored in memory of courier electronic devices 100 that have been transported onto the vehicle 150 by passengers and which have established communication links with the vehicle based content server 160. The vehicle based content server 160 may communicate via a data network 180 and wired connections to some onboard courier electronic devices 100 and/or wireless connections to other onboard courier electronic devices 100. Wired communication links may be established using network interfaces (e.g., USB ports) located at passenger seats, which may be connected to seat video display units 190 at each seat location. Wireless communication links may be established through wireless access points 152. Some courier electronic devices may wirelessly communicate directly with the wireless access points 152. Some other courier electronic devices 100 may wirelessly communicate indirectly with the wireless access points 152 via seat video display units 190 which relay communications directly between those courier electronic devices 100 and the wireless access points 152. Still some other current electronic devices may communicate through wired connections to the seat video display units 190 (e.g., via USB ports) which relay data through wireless links with the wireless access points 152.

The aircraft based content server 160 fetches (module 420) the content fragments from the courier electronic devices 100, responsive to the discovering. The content server 160 reassembles module 426) the content files by combining at least some of the content fragments, and provides content of the content files for playing through video display units operated by passengers.

As explained above, the reassembled content can be streamed and/or downloaded to seat video display units 190 and/or to courier electronic devices 100 responsive to user content requests. To provide the content files to passengers, the aircraft based content server 160 can add the content files to a listing of content files that are available for on-demand consumption through the video display units, and may further respond to on-demand content selection messages by streaming the content of the content files to the video display units attached to passenger seats, e.g., seat video display units 190, and/or to video display units within passenger courier electronic devices.

The aircraft based content server 160 may additionally or alternatively provide the content files to the crew information terminals that may be mounted within the aircraft 150 and/or transported onboard by crewmembers.

To fetch (module 420) the content fragments from the courier electronic devices 100, the aircraft based content server 160 can initiate concurrent transfer of the content fragments from the courier electronic devices 100. For example, as each courier electronic device 100 is carried onboard the aircraft 150 and establishes a communication link to the content server 160, the content server 160 can responsively communicate with the courier electronic device 100 to initiate transfer of its content fragment while ongoing transfer of other content fragments are being performed with earlier initiated transfers from other courier electronic devices 100 and which may continue current with subsequently initiated transfers of content fragments from subsequently identified courier electronic devices 100.

The content fragments being transferred from a first group of the courier electronic devices can contain data that is at least partially redundant with each other within the first group, and the content fragments being transferred from a second group of the courier electronic devices can contain data that is at least partially redundant with each other within the second group. The remaining transfer of content fragments from at least one of the first group of the courier electronic devices 100 can be terminated by the aircraft based content server 160 responsive to completing assembly of a first content file from a combination of partial content fragments received from at least some of the first group of the courier electronic devices 100 using the redundant data therein to supply data not yet received from the at least one of the first group of the courier electronic devices 100. Similarly, the remaining transfer of content fragments from at least one of the second group of the courier electronic devices 100 can be terminated by the aircraft based content server 160 responsive to completing assembly of a second content files from a combination of partial content fragments received from at least some of the second group of the courier electronic devices 100 using the redundant data therein to supply data not yet received from the at least one of the second group of the courier electronic devices 100.

The aircraft based content server 160 can identify (module 412) a content file that cannot be assembled because of at least one content fragment which is required to assemble the content file but is missing from memory of the courier electronic devices 100 discovered as having established communication links with the vehicle based content server 160. While off-board communications are permitted by courier electronic devices 100, such as before the cabin doors are closed in preparation for aircraft takeoff, the aircraft based content server 160 can attempt to fetch the missing content file through one or more of the identified courier electronic devices 100 off-board communication capability, such as through a cellular communication transceiver of the courier electronic device(s) 100 (block 416).

Accordingly, the aircraft based content server 160 can identify through the communication links which of the courier electronic devices 100 have ongoing off-board communication links that can be used to retrieve content fragments from the ground based content server, and fetch the at least one content fragment from the content server using communications routed through at least one of the courier electronic devices identified as having the ongoing off-board communication links.

In one embodiment, the aircraft based content server 160 communicates a message through one of the wireless access points 152 to an application on one of the courier electronic devices 100, which causes the courier electronic device 100 to use a cellular transceiver of the courier electronic device 100 to communicate through a cellular network outside the aircraft 150 to establish a communication link with the ground based content server 110 and fetch the missing content fragment(s) therefrom. The aircraft-based content server 160 may similarly communicate with a plurality of the identified courier electronic devices 100 to initiate concurrent fetching of the same missing content fragment from the ground based content server 110 through the cellular transceivers of the respective courier electronic devices 100. Such redundant fetching operations can increase the likelihood that the missing content fragment will be successfully retrieved by at least one of the initiated transfers.

A module 428 may control initiation and termination of such off-board fetching of content fragments via identified ones of the courier electronic devices 100 based on prioritization of which of the content fragments are most needed to enable assembly of content files having relative prioritized importance. When concurrent redundant transfers are initiated for the same missing content fragment, successful receipt and/or reassembly of the missing content fragment through one or more of the operated courier electronic devices 110 triggers the module 428 to terminate any continuing fetching of that same content fragment by other ones of the courier electronic devices 100. In one embodiment, the module 428 terminates any continuing fetching of that same content fragment by other ones of the courier electronic devices 100 when a threshold number (e.g., one) of the courier electronic devices 100 successfully receives that content fragment and before that content fragment has been relayed from the courier electronic device(s) 100 to the aircraft based content server 160. This early terminal allows more efficient use of communication resources of the courier electronic devices 100 (i.e., reducing communication costs imposed on the passenger(s)) since transfer of a large content fragment from the courier electronic device(s) 100 to the aircraft based content server 160 may take minutes during which continuing transfer of the content fragment by some of the courier electronic device(s) 100 from off-board to on-board the aircraft is anticipated to be unnecessary.

Similarly, responsive to the missing content fragment being subsequently identified as available on a threshold number of onboard courier electronic devices 100, the module 428 can terminate any continuing fetching of that same content fragment by the courier electronic devices 100. In this manner, the aircraft based content server 160 can rapidly initiate fetching of missing content fragments as courier electronic devices 100 are brought on board and linked to the aircraft based content server 160, and such transfers can be dynamically controlled to prioritize continuing transfer of only those content fragments that remain identified as being unavailable among any of the courier electronic devices 100 that are subsequently brought on board and linked to the aircraft based content server 160.

The aircraft based content server 160 may additionally or alternatively use an available aircraft ground data interface 170 to fetch (module 418) the missing content fragment through a cellular communication link. Thus, the courier electronic devices 110 can reduce or in some situations eliminate the need for use of the ground datalink interface 170 for transferring content files onboard and off-of the aircraft 150.

In some embodiments, the ground based content server 110 or other ground connectivity component can communicate with the courier electronic devices 100 to track their location, e.g., via GPS, with respect to an aircraft and, perhaps, before the courier electronic devices 100 have become connected to the onboard aircraft communication network. The ground based content server 110 can track proximity of the courier electronic devices 100 to a departure location and time of the aircraft to predict the probability of various content fragments being carried onto the aircraft, and can responsively control download of content fragments to those or other courier electronic devices 100. Furthermore, the ground based content server 110 may track progress of ongoing transfers of content fragments from courier electronic devices 100 to the onboard content server 160 and predict the probability of various content fragments successfully completing the transfer, and may responsively control download of content fragments to those or other courier electronic devices 100.

In some further operations, the aircraft based content server 160 identifies (module 412) a plurality of content files that cannot be assembled because of absent content fragments which are required to assemble the plurality of content files but are missing from memory of the courier electronic devices 100 discovered as having established communication links with the vehicle based content server 160. The content server 160 identifies through the communication links which of the courier electronic devices 100 have ongoing off-board communication links (e.g., communication connections to cellular transceiver base stations outside the aircraft 150) that can be used to retrieve content fragments from the ground based content server, and concurrently fetches the absent content fragments from the ground based content server 110 using communications routed through a plurality of the courier electronic devices 100 identified as having the ongoing off-board communication links.

In one embodiment, a first group of the absent content fragments being fetched through a first group of the courier electronic devices 100 identified as having the ongoing off-board communication links contain data that is at least partially redundant with each other within the first group, and a second group of the absent content fragments being fetched through a second group of the courier electronic devices 100 identified as having the ongoing off-board communication links contain data that is at least partially redundant with each other within the second group.

The aircraft based content server 160 terminates (module 428) remaining fetching of the first group of the absent content fragments through at least one of the first group of the courier electronic devices 100 responsive to completing assembly of a first content file from a combination of partial fetches of the first group of the absent content fragments received from the ground based content server 110 using the redundant data therein to supply data not yet received from the at least one of the first group of the courier electronic devices 100. Similarly, the content server 160 terminates remaining fetching of the second group of the absent content fragments through at least one of the second group of the courier electronic devices 100 responsive to completing assembly of a second content file from a combination of partial fetches of the second group of the absent content fragments received from the ground based content server 110 using the redundant data therein to supply data not yet received from the at least one of the second group of the courier electronic devices 100.

To assemble the content files by combining at least some of the content fragments, the aircraft based content server 160 may decrypt (module 422) the content fragments to generate decrypted content fragments, de-interleaved (module 424) data contained in the decrypted content fragments to generate de-interleaved data, and assemble (module 426) the content files from the de-interleaved data.

The courier electronic devices 100 can similarly be used to transport content files from the aircraft based content server 160 to the ground based content server 110. The operations to perform such transfers can include the aircraft based content server 160 identifying downlink content to be delivered to the ground based content server 110 via the courier electronic devices 100. The downlink content is divided into downlink content fragments, where the downlink content fragments collectively contain all data necessary for reassembling the downlink content. The downlink content fragments are then distributed from the aircraft based content server across memory of the courier electronic devices that have been discovered. The distributing is performed so that each of the courier electronic devices 100 is distributed one of the downlink content fragments containing data that is at least partially redundant with data contained in one of the downlink content fragments that is distributed to at least one other one of the courier electronic devices 100 and that is not redundant to data contained in other ones of the downlink content fragments that are distributed to still other ones of the courier electronic devices 100. Distributing redundant data can provide various advantages as described above.

Figure 5:
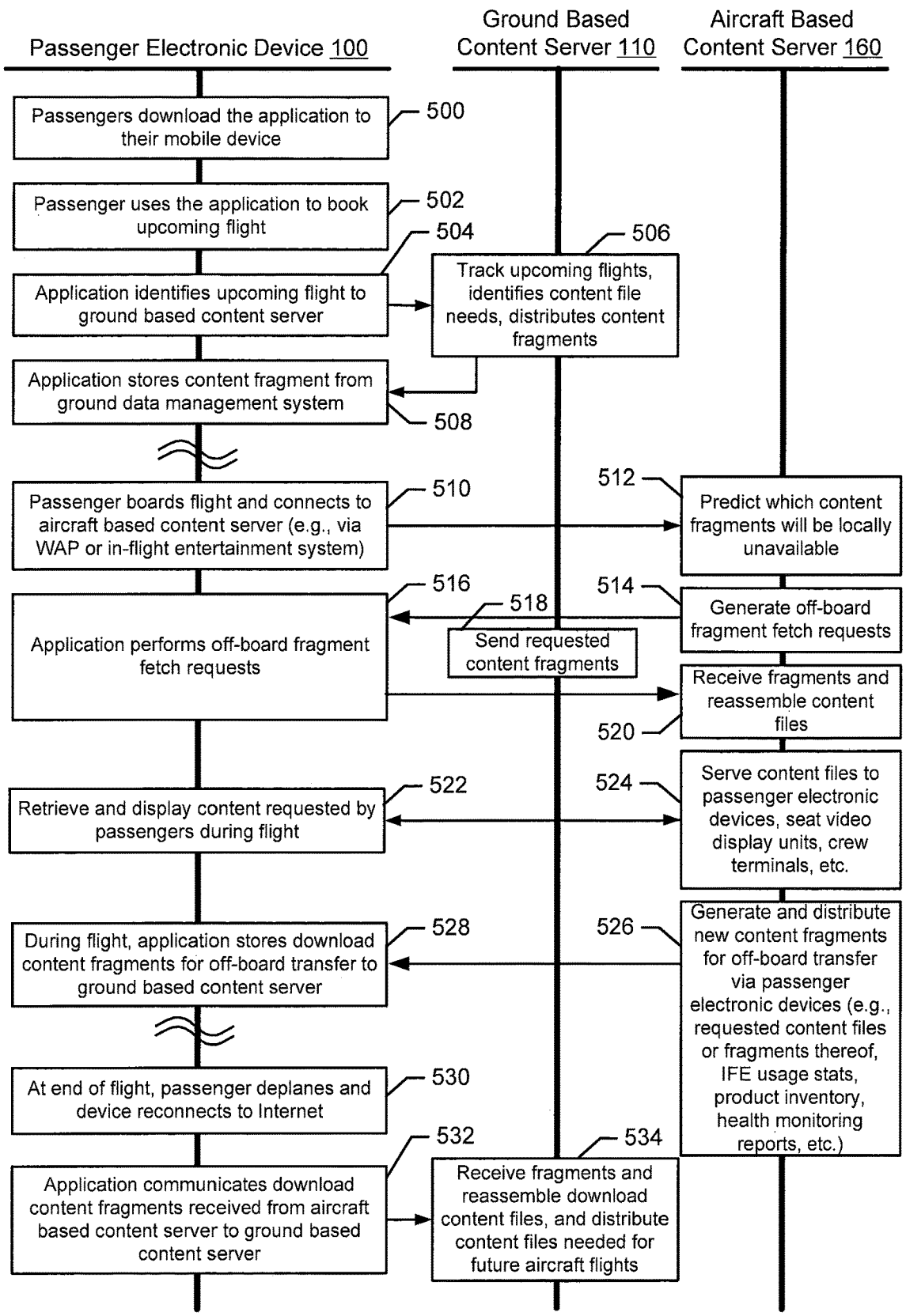
FIG. 5 is a combined flowchart and data flow diagram that illustrates operations and data transfers between a passenger electronic device, a ground based content server, and an aircraft based content server in accordance with some embodiments of the present disclosure.

Various further operational embodiments are now described in the context of FIG. 5 which is a combined flowchart and data flow diagram that illustrates operations and data transfers between a passenger electronic device 100, the ground based content server 110, and the aircraft based content server 160. In the example of FIG. 5, the person is a planned passenger so the courier electronic device 100 is also referred to as a passenger electronic device 100.

Referring to FIG. 5, the passenger electronic device 100 communicates a scheduling message to the ground based content server 160 indicating an upcoming flight schedule for a person who possesses the courier electronic device 100. In the example embodiment, a person downloads (block 500) an application to the passenger electronic device 100 which performs operations for communicating with the ground based content server 110 and the aircraft based content server 160 to enable the passenger electronic device 100 to be used to transfer content fragments there between. The application may be a flight reservation application that is operated by a person to review available flight schedules and book (block 502) a scheduled flight through the ground based content server 110 and/or another ground based server. During the reservation process or separate therefrom, the application cooperatively identifies (block 504) the upcoming flight to the ground based content server 110. The ground based content server 110 tracks (block 506) upcoming scheduled flights and passenger electronic devices which are associated with passengers who have confirmed reservations on those flights, and identifies content files that are desired to be transferred to content servers of aircraft which are scheduled to perform or are otherwise likely to perform those flight schedules. The ground based content server 110 generates the content fragments from those content files as explained above.

The person may control whether the passenger electronic device 100 is allowed to be used to carry a content fragments to the aircraft for upload, such as through a user permission setting provided by the application. Persons may be incentivized by the airline to participate in allowing their devices to be used to receive content fragments from the ground based content server 110 and later upon boarding of the aircraft to perform further steps that will be necessary to allow the devices to establish communication links with the aircraft based content server 160 and remain operational for a sufficient time that will allow the airplane based content server 160 to complete transfer of content fragments therefrom. For example, upon boarding the aircraft a passenger may need to operate the passenger electronic device to establish a WiFi connection to a wireless access point 152 within the aircraft, and start the application to allow the application to perform the necessary transfer operation.

As an incentive from the airline for a passenger to participate in allowing successful transfer of one or more content fragments using the passenger's electronic device, the passenger may be provided free or discounted Internet access through in-cabin WiFi links to off-board satellite communication links, and/or may be provided free or discounted access to premium entertainment content through the aircraft IFE system.

Accordingly, when allowed, the ground based content server 110 transfers one or more content fragments to the passenger electronic device 100, which stores (block 508) the content fragments in local memory. Each content fragment can be an incomplete fragment of a content file, such that the content file cannot be regenerated using only data contained in the content fragment. Moreover, when the ground based content server 110 transfers a plurality of content fragments to the passenger electronic device 100, the plurality of content fragments may be an incomplete representation of the content file, such that the content file cannot be regenerated using only data contained in the plurality of content fragments.

Upon boarding an aircraft for the scheduled flight, the passenger operates (block 510) that passenger electronic device 100 to establish a communication link to the aircraft based content server 160 and initiate transfer of the content fragment from the local memory of the passenger electronic device 100 to the aircraft based content server 160. The aircraft based content server 160 may dynamically develop and inventory that identifies what content fragments are available among passenger electronic devices 100 that have been linked thereto, and may predict (block 512) therefrom which content fragments will be locally unavailable, such as due to some passenger electronic devices 100 not being present on the aircraft 150 and/or not been turned on or otherwise communicatively linked to the aircraft based content server 160.

The aircraft based content server 160 may then attempt to fetch the predicted locally unavailable content fragments using off-board communication links that are determined to be available between the passenger electronic devices 100 and ground based network equipment, e.g., cellular radio base stations, which is network connected to the ground based content server 110 and/or to use an off-board communication link that is determined to be available through the ground datalink interface 170. Because the ground data links may be available only while the aircraft remains at a gate or otherwise on the ground, there is a short window of opportunity for the aircraft based content server 160 to request and complete any fetching of locally unavailable content fragments from the ground based content server 110. The aircraft based content server 160 may therefore initiate fetching of the locally unavailable content fragments when a threshold number of passenger electronic devices 100 have been linked to the server 160 and while passengers are continuing to board the aircraft 150. Although the content fragments being uploaded to the aircraft based content server 160 may be used to reassemble a content file intended for use during a next flight segment, the content file may not be necessary for the next flight segment but more generally desired to be made accessible by the end of a longer time frame, such as within a week. When a content file is desired to be accessible by the end of a longer time frame the content fragments generated therefrom may be distributed to passengers who are scheduled to fly on that aircraft sometime during that time frame.

Aircraft based content server 160 therefore generates (block 514) off-board fragment fetch requests which are communicated to at least some of the passenger electronic devices 100. The off-board fragment fetch request messages contain information that identifies which content fragments are requested from the ground based content server 110 and identifies the network address of the ground based content server 110. The passenger electronic devices 100 respond to the off-board fragment fetch request messages by forwarding (block 516) the messages to the ground based content server 110 using the identified network address. The ground based content server 110 receives and responds to the request messages by sending (block 518) the requested content fragments to the application on the passenger electronic devices 100, which forwards the received content fragments to the aircraft based content server 160. The aircraft based content server 160 receives the previously missing content fragments from the passenger electronic device 100, and reassembles (block 520) the content files therefrom.

The aircraft based content server 160 can then serve content files to the passenger electronic devices 100, seat video display units, crew terminals, and other electronic devices that are communicatively connected to the aircraft based content server 160. For example, the passenger electronic devices 100 can display on a display device a list of available content files residing on the aircraft based content server 160, and respond to a passenger selection by communicating a content selection message to the vehicle based content server 160 indicating a person's selection of a content file from among the list of content files, which is triggers retrieving (block 522) and displaying of content of the selected content file, e.g., receive and display a streaming movie, from the aircraft based content server 160.

As explained above, the passenger electronic devices 100 can be used to transport content files from the aircraft based content server 160 to the ground based content server 110. The aircraft based content server 160 generates (block 526) new content fragments from content files that are to be carried off-board, and distributes the new content fragments to the passenger electronic devices 100. The content files and that may be selected for off-board transport can include, without limitation, IFE usage statistics, onboard food inventory reports, onboard product inventory reports, onboard electronic systems health monitoring reports, and flight performance reports. The passenger electronic device 100 receives and stores (block 528) the content fragment(s) downloaded from the aircraft based content server 160 for transfer to the ground based content server 110. At the end of the flight, the passenger deplanes and transports the passenger electronic device 100 to the airport terminal elsewhere where the passenger electronic device 100 reconnects (block 530) by operation of the application to the ground based content server 110 through a ground based communication network. Content files may be copied from one aircraft to another aircraft by dispersing the related content fragments to passengers who are scheduled to subsequently fly on the next aircraft.

The passenger electronic device 100, via the application, communicates (block 532) the content fragments received from the aircraft based content server 160 to the ground based content server 110, which receives the content fragments and reassembles (block 534) the content files from the aircraft based content server 160. The ground based content server 110 may distribute other content files to the passenger electronic device 100 if identified as being scheduled for a future aircraft flight.

Example Content Server and Courier Electronic Device

Figure 6:
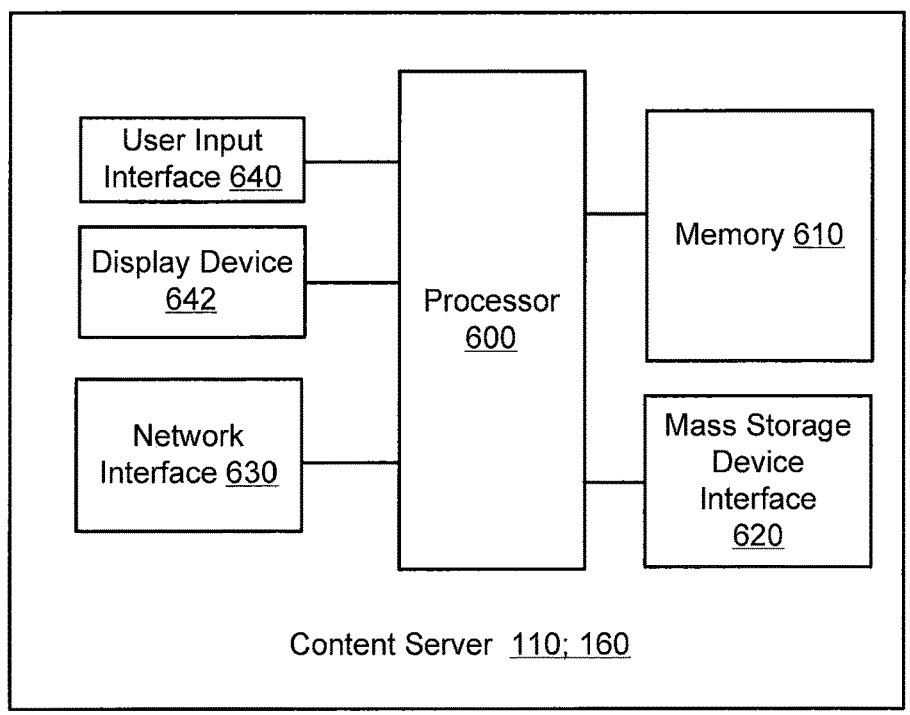
FIG. 6 is a block diagram of a content server configured to operate according to some embodiments of the present disclosure.

FIG. 6 is a block diagram of a content server configured to operate according to some embodiments of the present disclosure. The content server may be configured to operate as the ground based content server 110 and/or the aircraft based content server 160 disclosed herein. Referring to FIG. 6, the content server includes a processor 600, a memory 610, and a network interface 620 which may include a radio access network transceiver and/or a wired network interface (e.g., Ethernet interface). The network interface 620 is configured to communicate with courier electronic devices 100.

The processor 600 may include one or more data processing circuits, such as a general purpose and/or special purpose processor (e.g., microprocessor and/or digital signal processor) that may be collocated or distributed across one or more networks. The processor 600 is configured to execute computer program code in the memory 610, described below as a non-transitory computer readable medium, to perform at least some of the operations described herein as being performed by an access control computer. The computer program code when executed by the processor 600 causes the processor 600 to perform operations in accordance with one or more embodiments disclosed herein for the ground based content server 110 and/or the aircraft based content server 160. The content server may further include a user input interface 640 (e.g., touch screen, keyboard, keypad, etc.) and a display device 642.

Figure 7:
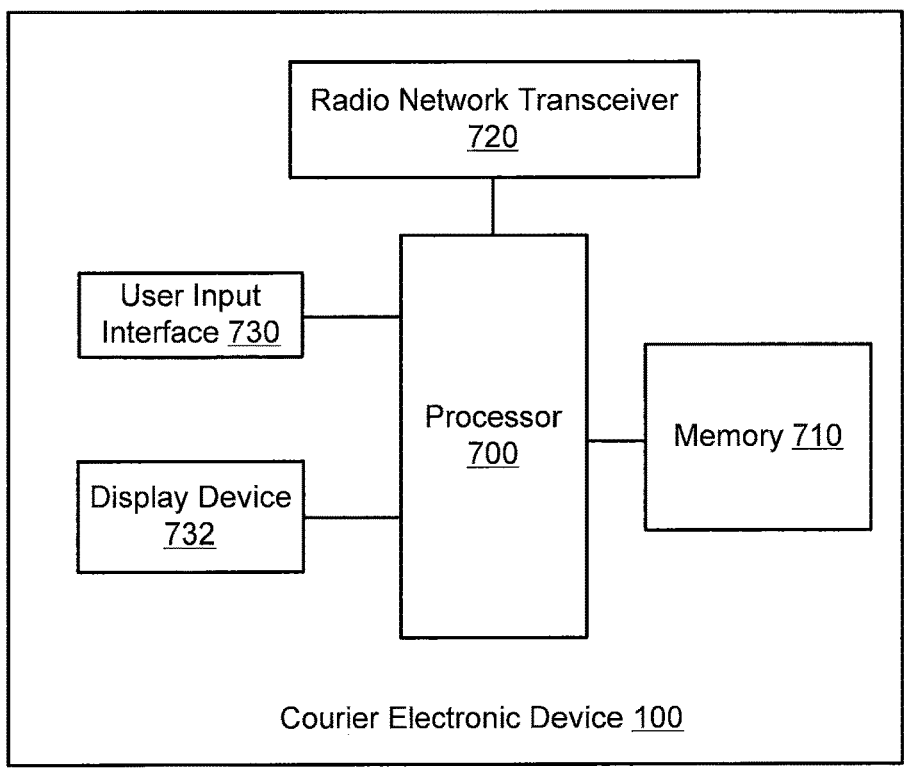
FIG. 7 is a block diagram of a courier electronic device configured to operate according to some embodiments of the present disclosure.

FIG. 7 is a block diagram of a courier electronic device 100 configured to operate according to some embodiments of the present disclosure. Referring to FIG. 7, the courier electronic device 100 includes a processor 700, a memory 710, and a radio network transceiver 710 which can include, but is not limited to, a LTE or other cellular transceiver, WLAN transceiver (IEEE 802.11), WiMax transceiver, or other radio communication transceiver or wired network interface (e.g., Ethernet and/or USB) configured to communicate with the ground based content server 110 and/or the aircraft based content server 160.

The processor 700 may include one or more data processing circuits, such as a general purpose and/or special purpose processor (e.g., microprocessor and/or digital signal processor) that may be collocated or distributed across one or more networks. The processor 700 is configured to execute computer program code in the memory 710, described below as a non-transitory computer readable medium, to perform at least some of the operations described herein as being performed by an access control computer. The computer program code when executed by the processor 700 causes the processor 700 to perform operations in accordance with one or more embodiments disclosed herein for the courier electronic device 100. The courier electronic device 100 may further include a user input interface 730 (e.g., touch screen, keyboard, keypad, etc.) and a display device 732.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by at least one processor of a vehicle based content server to receive content files provided by a ground based content server, the method comprising:
   discovering through communications via a wireless network interface presence of content fragments stored in memory of courier electronic devices that have been transported onto the vehicle by passengers and which have established communication links with the vehicle based content server;
   fetching the content fragments from the courier electronic devices through communications via the wireless network interface, responsive to the discovering, wherein the fetching comprises:
      initiating concurrent transfer of the content fragments from the courier electronic devices, wherein the content fragments being transferred from a first group of the courier electronic devices contain data that is at least partially redundant with each other within the first group; and
      terminating remaining transfer of content fragments from at least one of the first group of the courier electronic devices responsive to completing assembly of a first content file from a combination of partial content fragments received from at least some of the first group of the courier electronic devices using the redundant data therein to supply data not yet received from the at least one of the first group of the courier electronic devices;
   assembling the content files by combining at least some of the content fragments; and
   providing content of the content files to video display units operated by passengers.

2. The method of claim 1, wherein the fetching the content fragments from the courier electronic devices, responsive to the discovering, further comprises
   wherein the content fragments being transferred from a second group of the courier electronic devices contain data that is at least partially redundant with each other within the second group; and
   terminating remaining transfer of content fragments from at least one of the second group of the courier electronic devices responsive to completing assembly of a second content files from a combination of partial content fragments received from at least some of the second group of the courier electronic devices using the redundant data therein to supply data not yet received from the at least one of the second group of the courier electronic devices.

3. The method of claim 1, further comprising:
   identifying a content file that cannot be assembled because of at least one content fragment which is required to assemble the content file but is missing from memory of the courier electronic devices discovered as having established communication links with the vehicle based content server;
   identifying through the communication links which of the courier electronic devices have ongoing off-board communication links that can be used to retrieve content fragments from the ground based content server; and fetching the at least one content fragment from the content server using communications routed through at least one of the courier electronic devices identified as having the ongoing off-board communication links.

4. A method by at least one processor of a vehicle based content server to receive content files provided by a ground based content server, the method comprising:
- discovering through communications via a wireless network interface presence of content fragments stored in memory of courier electronic devices that have been transported onto the vehicle by passengers and which have established communication links with the vehicle based content server;
- fetching the content fragments from the courier electronic devices through communications via the wireless network interface, responsive to the discovering;
- identifying a plurality of content files that cannot be assembled because of absent content fragments which are required to assemble the plurality of content files but are missing from memory of the courier electronic devices discovered as having established communication links with the vehicle based content server;
- identifying through the communication links which of the courier electronic devices have ongoing off-board communication links that can be used to retrieve content fragments from the ground based content server;
- concurrently fetching the absent content fragments from the ground based content server using communications routed through a plurality of the courier electronic devices identified as having the ongoing off-board communication links,
  - wherein a first group of the absent content fragments being fetched through a first group of the courier electronic devices identified as having the ongoing off-board communication links contain data that is at least partially redundant with each other within the first group;
- terminating remaining fetching of the first group of the absent content fragments through at least one of the first group of the courier electronic devices responsive to completing assembly of a first content file from a combination of partial fetches of the first group of the absent content fragments received from the ground based content server using the redundant data therein to supply data not yet received from the at least one of the first group of the courier electronic devices;
- assembling the content files by combining at least some of the content fragments; and
- providing content of the content files to video display units operated by passengers.

5. The method of claim 1, wherein the assembling the content files by combining at least some of the content fragments, comprises:
- decrypting the content fragments to generate decrypted content fragments;
- de-interleaving data contained in the decrypted content fragments to generate de-interleaved data; and
- assembling the content files from the de-interleaved data.

6. The method of claim 1, further comprising:
- identifying downlink content to be delivered to the ground based content server via the courier electronic devices;
- dividing the downlink content into downlink content fragments, wherein the downlink content fragments collectively contain all data necessary for reassembling the downlink content, and
- distributing the downlink content fragments from the aircraft based content server across memory of the courier electronic devices that have been discovered, wherein the distributing is performed so that each of the courier electronic devices is distributed one of the downlink content fragments containing data that is at least partially redundant with data contained in one of the downlink content fragments that is distributed to at least one other one of the courier electronic devices and that is not redundant to data contained in other ones of the downlink content fragments that are distributed to still other ones of the courier electronic devices.

7. The method of claim 4, further comprising:
- wherein the concurrently fetching of the absent content fragments from the ground based content server using communications routed through a plurality of the courier electronic devices identified as having the ongoing off-board communication links, comprises fetching a second group of the absent content fragments through a second group of the courier electronic devices identified as having the ongoing off-board communication links, wherein the second group of the absent content fragments contain data that is at least partially redundant with each other within the second group; and
- terminating remaining fetching of the second group of the absent content fragments through at least one of the second group of the courier electronic devices responsive to completing assembly of a second content file from a combination of partial fetches of the second group of the absent content fragments received from the ground based content server using the redundant data therein to supply data not yet received from the at least one of the second group of the courier electronic devices.

* * * * *